July 2, 1968     J. G. PADELT     3,390,592
COUPLING FOR SHUTTER RELEASE CABLE FOR CAMERAS
Filed Aug. 10, 1966
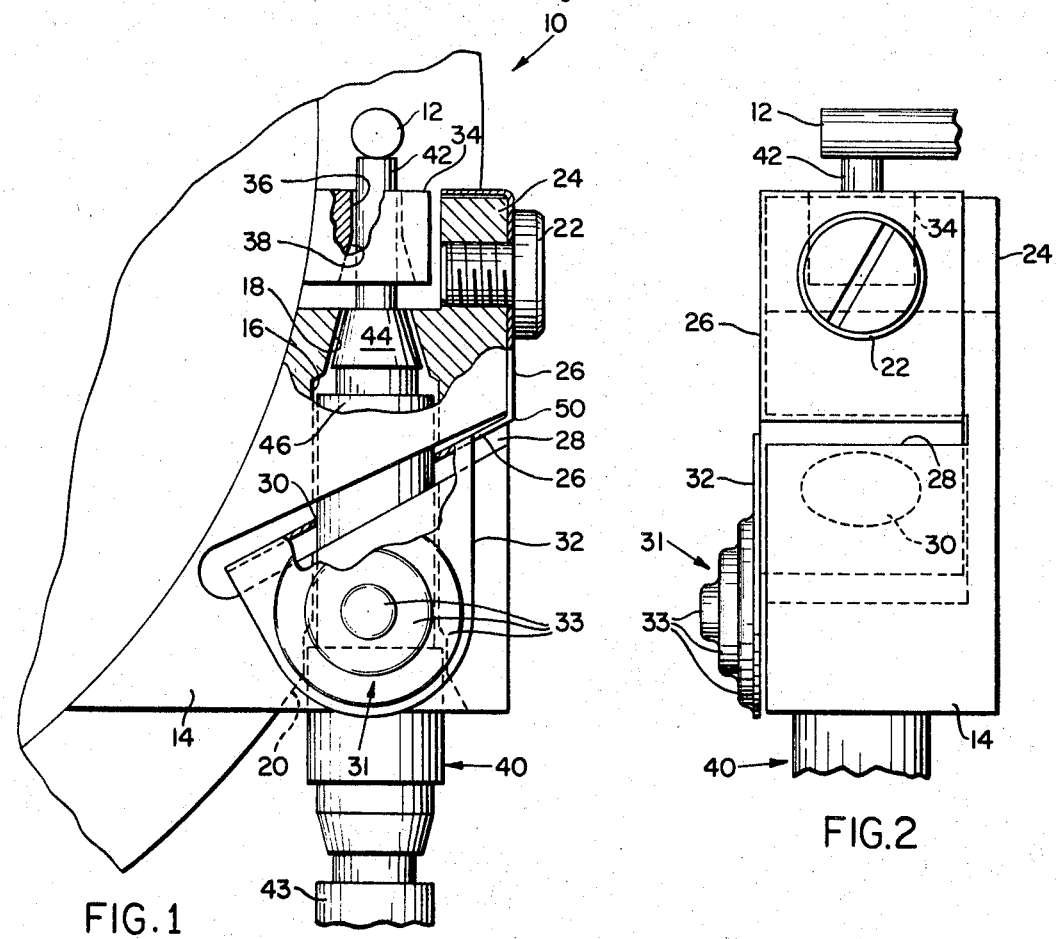
FIG.1
FIG.2
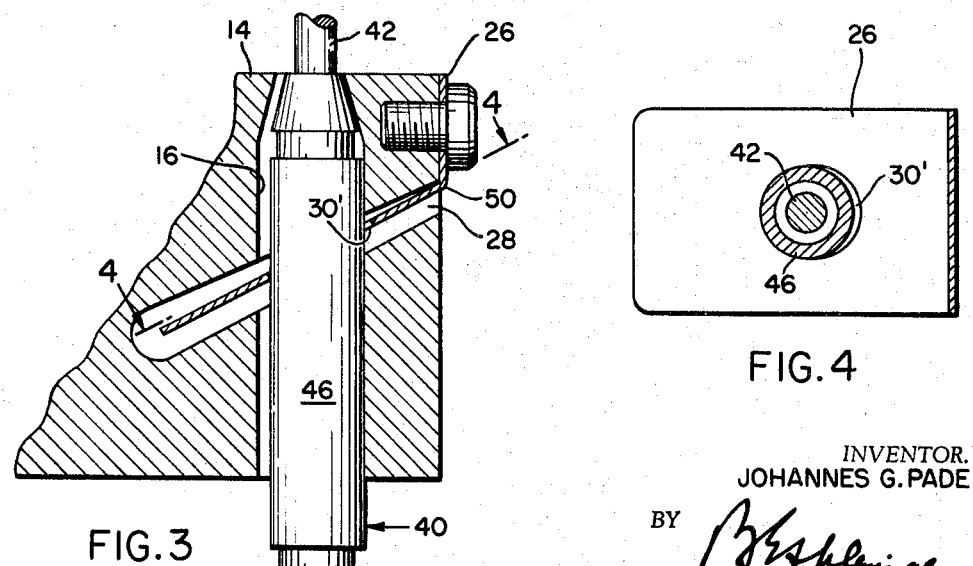
FIG.3
FIG.4
INVENTOR.
JOHANNES G. PADELT
BY
ATTORNEY

# United States Patent Office 3,390,592
Patented July 2, 1968

3,390,592
COUPLING FOR SHUTTER RELEASE CABLE
FOR CAMERAS
Johannes G. Padelt, Rochester, N.Y., assignor to Graflex,
Inc., Rochester, N.Y., a corporation of Delaware
Filed Aug. 10, 1966, Ser. No. 571,593
4 Claims. (Cl. 74—531)

ABSTRACT OF THE DISCLOSURE

For quickly coupling a shutter release cable to a camera, a block is secured to a camera that has a bore therethrough into which the shutter-tripping end of the cable is pushed. A leaf spring is fastened in this block. This leaf spring has a portion which extends into a slot in the block, and which has a hole through it through which the cable projects. The resilience of the spring normally cants this portion of the spring to the axis of the cable and its hole bites into the cable to couple the cable to the camera. By pushing up on said portion of the spring the cable is released.

---

This invention relates to photographic cameras, and more particularly to means for connecting a shutter-release cable to a camera shutter.

To attach the shutter release cable to a camera, it has been customary heretofore to thread one end of the cable sheath into a fixture on the side of a camera, with the operating end of the cable registering with the shutter release pin. The disadvantage of this type of construction is that it is often difficult and always time-consuming to thread the cable sheath properly into the fixture. Also, the threaded end of the sheath is very susceptible to damage when detached from the camera.

An object of this invention is to provide improved means for connecting a cable release to a camera shutter.

Another obect of this invention is to provide a relatively simple and inexpensive device for rapidly connecting and disconnecting a cable release to a camera shutter.

Another object of the invention is to provide a cable release which can not only be connected quickly to a camera shutter but which will automatically lock itself in place when connected, yet which may be quickly disconnected.

Other objects of the invention will be apparent hereinafter from the specification and from the recital of the appended claims, particularly when read in conjunction with the accompanying drawing.

In the drawing:

FIG. 1 is a fragmentary front elevational view showing a cable release connector made in accordance with one embodiment of this invention, parts of the mechanism being cut away and shown in section;

FIG. 2 is a fragmentary side view of this device;

FIG. 3 is a view similar to FIG. 1, but illustrating a modified form of connector; and FIG. 4 is a fragmentary sectional view taken along the line 4—4 in FIG. 3 looking in the direction of the arrows.

In the illustrated embodiments of the invention, the connector comprises a small block or fixture, which is cemented, screwed, or otherwise secured to the lens board or lens mount of a camera adjacent its shutter release pin. The block has a bore, which registers with the shutter release pin, and a slot, which extends from its outer face transversely across the bore. A leaf spring is secured at one end to the block, and projects into the slot transversely across the bore. The major portion of the spring is inclined to the axis of the bore, and has an opening therein which registers with the bore. When one end of a standard cable release is inserted into the bore in the block and through the registering hole in the leaf spring, the hole in the spring will immediately frictionally grip the periphery of the cable release and lock the release to the block.

When it is desired to withdraw the cable release from the block, the leaf spring is pivoted to release the frictional pressure on the cable release.

Referring now to the drawing by numerals of reference, 10 designates a camera lens housing having a shutter release pin 12, which is adapted to function in conventional manner to release the camera shutter (not illustrated) after the latter has been cocked. Secured to the outside of the camera housing 10 adjacent the pin 12 is a hollow block or housing 14, which has therethrough a bore 16 that registers with the pin 12. Adjacent pin 12, the bore 16 is inwardly tapered as denoted at 18; and at the opposite end of the bore there is a countersink forming an outwardly diverging conical surface 20.

Secured at one end thereof by a screw 22 to a lug 24, which projects from the upper end of the block 14 adjacent the pin 12 is a metal leaf spring 26. Spring 26 is bent at 50 so that it extends into a slot 28 in the block 14, and diagonally across the bore 16 intermediate the ends thereof. The inner portion of spring 26 has therethrough a circular opening 30, which registers with the bore 16; and it also has a lateral flange portion 32, which projects out of the slot 28 to overlie one side of block 14. A plurality of concentric bosses 33 of progressively increasing diameter form a raised, push-button 31 on flange 32.

Secured to the lens housing 10 inside lug 24 and beneath the shutter release pin 12 is a cable guide member 34. Member 34 has therethrough a bore 36, which registers with pin 12 and with the bore 16 in block 14, and which is counterbored in the end thereof confronting block 14 to have an internal conical surface 38.

40 is a standard cable release, comprising a cable or Bowden wire 42, which is reciprocable in a flexible sheath 43. At the end thereof, which is adapted to be secured to the lens housing, the sheath 43 terminates in a conically shaped head 44, which may be externally knurled. Rearwardly of this head the sheath 43 carries a nipple 46.

For use, the illustrated end of the cable release 40 is inserted manually through the conical end 20 of the bore 16 to seat the head 44 in the conical end 18 of the bore 16 and bring cable 42 into engagement with pin 12. As the sheath 46 passes upwardly, spring 26 will yield to permit upward passage through hole 30, but as soon as this upward movement stops, the natural resilience of the spring causes the spring 26 to be canted downwardly so that its bites, around hole 30 and particularly at diametrally opposite sides thereof, into the nipple 46 to grip and lock the cable release in operative relation with pin 12.

To disconnect the cable release from the lens housing, the button 31 is pushed upwardly (in FIG. 1) to flex the spring 26 about its bend 50. The nipple 46 may then easily be pulled out of opening 30 and bore 16.

In the embodiment illustrated in FIG. 3, wherein like numerals are employed to designate elements identical to those employed in the first embodiment, the construction is essentially the same, except that the opening 30' in the spring 26 is oval, with its major axis extending parallel to the major portion of the spring 26. As a result, nipple 46 is gripped only at one side of the opening 30.' The nipple 46 is resiliently urged into frictional engagement with the right side (FIG. 3) of the bore 16, rather than being suspended in radially spaced relation to the bore 16 as in the first embodiment. To release nipple 46 from the opening 30', the spring 26 is pivoted upwardly (FIG. 3) in the slot 28 by means of the button 31 in the same manner as in the first embodiment.

From the foregoing it will be apparent that applicant has devised a relatively simple and inexpensive device for releasably securing a standard cable release to a camera housing. Unlike prior such devices, which required the operator to thread the release mechanism carefully into a fixture on the side of the lens mount, applicant's novel device permits the release mechanism to be inserted and locked substantially instantly in place and correctly by even the clumsiest of operators. Likewise, by a simple pivotal movement of the spring 26, the cable release device is instantly disconnected from block 14. Moreover, applicant's novel device is substantially less expensive to manufacture than prior such devices, since there is no need to provide internal threads in the bore in the block 14 for accommodating the threaded end of the cable release mechanism.

While the invention has been described in connection with specific embodiments thereof, it will be understood that it is capable of further modification, and this application is intended to cover any further variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A quick-locking connector for the shutter release cable of a camera, comprising in combination
   (a) a block secured to the camera, said block having a bore therethrough, and
   (b) a leaf spring secured to said block, and having a portion extending into a slot in said block transversely across said bore,
   (c) said portion being disposed by the inherent flexibility of said spring normally to be canted at an acute angle to the axis of said bore and having therethrough an opening which registers with said bore, and whose edge is adapted frictionally to grip the cable and hold it in said bore when the cable is inserted into said bore, said spring being flexible to release said cable.

2. A quick-locking connector for a camera shutter release cable, comprising
   a block having therethrough a bore, and
   a leaf spring secured to said block and extending into a slot in said block transversely across said bore,
   said spring being disposed normally to be inclined to the axis of said bore and having therethrough an opening which registers with said bore, and whose edge is adapted frictionally to grip the cable and hold it in said bore when the cable is inserted into said bore,
   said spring having a lateral flange which projects out of said slot and constitutes a manipulating button,
   said button being manually movable to pivot said spring about an axis, which extends transverse to the axis of said bore, to disengage the peripheral edge of said opening from said cable, thereby to release said cable from said bore.

3. A connector as defined in claim 2, wherein said spring has therethrough a circular opening, substantially the entire peripheral edge of which is frictionally engageable with said cable to lock and support said cable in radially spaced relation to the wall of said bore.

4. A connector as defined in claim 2, wherein said spring has a circular opening therethrough which is resiliently engageable with a release cable to hold said cable frictionally against the wall of said bore.

References Cited
UNITED STATES PATENTS

| | | | |
|---|---|---|---|
| 1,214,700 | 2/1917 | Marks | 74—502 |
| 2,120,681 | 6/1938 | Ryder | 74—502 |
| 2,448,897 | 9/1948 | Livingston | 74—502 |
| 2,543,510 | 2/1951 | Sandberg | 74—502 |
| 2,683,381 | 7/1954 | Cadwell | 74—502 |
| 3,185,062 | 5/1965 | Aurandt | 74—501 X |
| 3,116,646 | 1/1964 | Seckerson | 174—135 |

OTHER REFERENCES
"Strain Relief Device," Uberbacher, IBM Technical Disclosure Bulletin, vol 4, No. 8, January 1962.

FRED C. MATTERN, JR., *Primary Examiner.*

C. F. GREEN, *Assistant Examiner.*